United States Patent [19]

Kiovsky et al.

[11] 4,059,543

[45] Nov. 22, 1977

[54] CLINOPTILOLITE SORBENT

[75] Inventors: Joseph R. Kiovsky; Pramad B. Koradia, both of Kent, Ohio

[73] Assignee: Norton Company, Worcester, Mass.

[21] Appl. No.: 589,070

[22] Filed: June 23, 1975

[51] Int. Cl.$^2$ .................. B01J 29/06; B01J 29/00
[52] U.S. Cl. ...................... 252/455 Z; 252/450; 55/75
[58] Field of Search ............. 252/450, 455 Z; 423/112; 55/66, 75

[56] References Cited

U.S. PATENT DOCUMENTS

| | | | |
|---|---|---|---|
| 3,337,474 | 8/1967 | Cornelius et al. | 252/455 Z |
| 3,346,328 | 10/1967 | Jergeys et al. | 252/455 Z |
| 3,375,064 | 3/1968 | Miale et al. | 252/455 Z |
| 3,476,821 | 11/1969 | Brandenburg et al. | 252/455 Z |

*Primary Examiner*—Carl F. Dees
*Attorney, Agent, or Firm*—Rufus M. Franklin

[57] ABSTRACT

Clinoptilolite is exchanged to the ammonium form and then treated with a dilute solution of a strong acid. An adsorbent for acid gases of improved capacity and life is obtained. The adsorbent is preferably in the form of ceramic bonded pellets.

3 Claims, No Drawings

CLINOPTILOLITE SORBENT

FIELD OF THE INVENTION

The invention relates to a sorption method and a particular molecular sieve sorbent for removing acid gases such as sulfur dioxide and oxides of nitrogen from gases, particularly from exhaust gases to be discharged into the atmosphere from chemical manufacturing processes. In such exhaust gases the concentration of $SO_2$ or oxides of nitrogen is ordinarily of the order of 1% to 2000 parts per million or lower.

BACKGROUND OF THE INVENTION

The use of solid sorbents for use in pollution control has, in many cases, been rejected in favor of liquid sorbtion systems. One of the reasons for rejection of solid sorbents is their low sorption capacity as compared to other systems, and their limited life (loss of capacity due to use).

Clinoptilolite is a natural zeolite found in substantial deposits in the western United States and elsewhere. Its sorption properties for $SO_2$ and other gases have been measured and reported in the literature, for example by J. K. Tamboli and L. B. Sand in "Procedings of the Second International Clean Air Congress", pp. 861–864, published by Academic Press, New York, 1971. In that article the authors show that natural clinoptilolite, acid treated, has about 75% of the static capacity for $SO_2$, at a partial pressure of one-half atmosphere, as does synthetic mordenite. The article concludes that natural siliceous zeolites such as clinoptilolite may have application in pollution control, particularly where acid stability is required. R. M. Barrer and M. B. Makki in *Canadian Journal of Chemistry*, Vol. 42 (1964) pp. 1481 to 1487, report on the sorptive properties of acid treated natural clinoptilolite for nitrogen, water, and various organic compounds. So far as applicant is aware, no commercial application of clinoptilolite in the sorption of acid gases has been made to date.

SUMMARY OF THE INVENTION

While, as is known, acid treatment of natural clinoptilolite enhances its initial sorptive capacity, such acid treated material has been found to have limited life in service. The present invention resides in the discovery that ammonium ion exchange in conjunction with acid treatment yields a sorbent with enhanced life in service combined with high sorptive capacity particularly at low partial pressures of the sorbate gas.

More specifically we have found that essentially complete ammonium exchanges (e.g. 98% or greater removal of exchangeable metal ions) followed by mild acid treatment results in the desired combination of capacity and life. By mild acid treatment we mean any acid treatment sufficient to increase the silica to alumina ratio of the zeolite, but insufficient to increase the silica to alumina ratio to a value higher than 11.5 to 1.

Although the ammonium exchanges preferably precedes the acid exchange, it is within the scope of the invention that the acid treatment be first or other treatments or exchanges may be carried out on the clinoptilolite mineral prior to the ammonium exchange. Prior to use, the material is calcined, which results in a hydrogen exchanged variety, even if ammonium exchange was the last preceding step. When the clinoptilolite is to be bonded into pellet form, with or without the addition of other zeolites, with an acid stable alumina-silica ceramic bond, it is desireable that the ammonium and acid treatment precede the bonding and pelletizing steps.

The silica to alumina ratio of natural clinoptilolite is from 8.5 to 9.5. After treatment according to this invention, the silica to alumina ratio should be between 9.7 and 11.5, exclusive of any silica added as a bond in pelletizing the material.

In particular, it has been found that the ammonium exchange treatment is effective in removing exchangeable potassium from the zeolite, which is not removed by acid treatment or other known exchange techniques. Although trace amounts of potassium remain, it is a requirement of the present invention that all potassium exchangeable by the ammonium exchange be removed from the zeolite. It is this feature of the invention, it is believed, which leads to the improved life of the material relative to clinoptilolite which has been treated by methods of the prior art, e.g. acid leaching.

EXAMPLE OF PREFERRED EMBODIMENT

Clinoptilolite from the Northwestern United States was crushed to pass through a 100 mesh screen, then ammonium exchanged with 3 normal ammonium nitrate in the amount of 4 cc. of solution per gram of solids for a total of 3 exchanges, with fresh solution each time, and with each exchange lasting 3 hours. The sample was then water washed and the exchange repeated two more times. Next, the solids were leached with 0.5 normal hydrochloric acid under refluxing conditions for 4 hours, using 4 cc of acid per gram of solids. After leaching, the powder was water washed at 100° C, and then mixed with a clay bond, extruded into pellet form, air dried, and fired at 538° C for 5 hours.

The zeolite of this example, in accelerated life tests, showed essentially no decrease in $SO_2$ adsorption capacity after over 700 cycles of adsorption and regeneration.

What is claimed is:

1. An acid gas sorbent consisting of clinoptilolite which has been ammonium exchanged to remove essentially all exchangeable metal cations and has been acid treated to increase the silica to alumina ratio to not greater than 11.5.

2. Natural clinoptilolite, in the hydrogen exchanged form, having a silica to alumina ratio greater than in the naturally occuring product but not greater than 11.5, and containing no exchangeable alkali or alkaline earth metal cations.

3. A sorbent pellet for sorption of acid gases consisting of natural clinoptilolite bonded by an acid resistant ceramic bond, said clinoptilolite being in the hydrogen exchanged form containing no exchangeable potassium and having a silica to alumina ratio of between 9.7 and 11.5.

* * * * *